United States Patent
Lee et al.

(10) Patent No.: US 11,952,905 B1
(45) Date of Patent: Apr. 9, 2024

(54) DETECTING ENGINE EXHAUST DEBRIS USING SATURATION CURRENT

(71) Applicant: Raytheon Technologies Corporation, Farmington, CT (US)

(72) Inventors: Jeremiah C. Lee, Coventry, CT (US); Daniel McMenamin, Ellington, CT (US); Alek Gavrilovski, Atlanta, GA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/962,102

(22) Filed: Oct. 7, 2022

(51) Int. Cl.
*F01D 21/00* (2006.01)

(52) U.S. Cl.
CPC ........ *F01D 21/003* (2013.01); *F05D 2260/80* (2013.01); *F05D 2270/306* (2013.01); *F05D 2270/80* (2013.01)

(58) Field of Classification Search
CPC ............... F01D 21/003; F05D 2260/80; F05D 2270/306; F05D 2270/80
See application file for complete search history.

(56) References Cited

U.S. PATENT DOCUMENTS

| | | | | |
|---|---|---|---|---|
| 3,541,431 A * | 11/1970 | Maise | G01N 27/626 | 324/464 |
| 3,775,763 A * | 11/1973 | Couch | G01N 27/62 | 340/627 |
| 4,528,844 A * | 7/1985 | Couch | F04D 27/001 | 73/112.06 |
| 4,531,486 A * | 7/1985 | Reif | G01N 27/62 | 73/28.02 |
| 4,565,969 A * | 1/1986 | Olson | G01N 27/626 | 436/154 |
| 4,573,123 A * | 2/1986 | Rosenbush | G01M 15/14 | 701/100 |
| 4,578,756 A * | 3/1986 | Rosenbush | F02C 9/00 | 701/100 |
| 4,586,139 A * | 4/1986 | Rosenbush | G07C 3/00 | 702/183 |
| 4,587,614 A * | 5/1986 | Couch | G07C 3/00 | 702/183 |
| 5,705,930 A * | 1/1998 | Forfitt | G01N 27/626 | 324/553 |
| 10,073,008 B2 * | 9/2018 | Weickert | G01M 15/14 | |
| 2005/0274116 A1 * | 12/2005 | Thornton | F23N 5/123 | 60/776 |
| 2009/0295400 A1 | 12/2009 | Wilhelm | | |

(Continued)

FOREIGN PATENT DOCUMENTS

DE 102012212711 B4 11/2020
WO WO-03034053 A2 * 4/2003 ......... G01N 15/0656

OTHER PUBLICATIONS

Translation WO-03034053-A2 (Year: 2023).*

(Continued)

*Primary Examiner* — J. Todd Newton
(74) *Attorney, Agent, or Firm* — Getz Balich LLC

(57) ABSTRACT

A method is provided for an engine. During this method, a saturation current of a gas flow is measured. The gas flow includes combustion products generated by the engine. The saturation current is monitored to determine presence of debris entrained within the gas flow.

20 Claims, 4 Drawing Sheets

(56) References Cited

U.S. PATENT DOCUMENTS

| | | | |
|---|---|---|---|
| 2010/0180668 A1* | 7/2010 | Kruse | G01N 15/0656 |
| | | | 73/28.01 |
| 2017/0212011 A1* | 7/2017 | Weickert | G01N 15/0656 |
| 2021/0104945 A1* | 4/2021 | Noyes | F01D 15/10 |
| 2021/0208101 A1 | 7/2021 | Aldayeh | |

OTHER PUBLICATIONS

"Detecting Abnormal Turbine Engine Deterioration Using Electrostatic Methods", Journal of Aircraft, vol. 15, Oct. 1978, pp. 692-695 (Year: 1978).*
"Electronic Analysis of Electrostatic Pulses to Detect Imminent Jet Engine Gas-Path Failure," Air Force Institute of Technology, Wright-Patterson AFB, Ohio, Thesis AFIT/GE/EE/77-7, Dec. 1977 (available DDC, AD-A0565 I 5). (Year: 1977).*
Baker, Electronic Analysis of Electrostatic Pulses to Detect Imminent Jet Engine Gas-Path Failure, Dec. 1977, Air Force Institute of Technology, Wright Patterson AFB (Year: 1977).*
EP Search Report for EP Patent Application No. 23202427.3 dated Feb. 12, 2024.

* cited by examiner

DETECTING ENGINE EXHAUST DEBRIS USING SATURATION CURRENT

BACKGROUND OF THE DISCLOSURE

1. Technical Field

This disclosure relates generally to an engine and, more particularly, to an exhaust debris monitoring system for the engine.

2. Background Information

An engine such as a gas turbine engine may include a monitoring system for detecting debris within an exhaust gas flow. Various types and configurations of exhaust debris monitoring systems are known in the art. While these known exhaust debris monitoring systems have various benefits, there is still room in the art for improvement. There is a need in the art therefore for an improved exhaust debris monitoring system.

SUMMARY OF THE DISCLOSURE

According to an aspect of the present disclosure, a method is provided for an engine. During this method, a saturation current of a gas flow is measured. The gas flow includes combustion products generated by the engine. The saturation current is monitored to determine presence of debris entrained within the gas flow.

According to another aspect of the present disclosure, a method is provided for a gas turbine engine. During this method, a gas flow is directed through a gap between a plurality of electrodes. The gas flow includes combustion products generated by combustion of a fuel-air mixture within the gas turbine engine. Electrical potential is directed across the gap through the gas flow between the electrodes. A voltage of the electrical potential directed across the gap is varied. A saturation current of the electrical potential directed across the gap is measured as the voltage is varied. Presence of debris particles entrained within the gas flow is determined based on the saturation current.

According to still another aspect of the present disclosure, an engine system is provided that includes a saturation current probe and a processing system. The saturation current probe is configured to measure a saturation current of a gas flow. The gas flow includes combustion products generated within an engine by combustion of a fuel-air mixture. The processing system is configured to determine presence of debris particles entrained within the gas flow with the combustion products based on the saturation current.

The debris particles may be distinct from emissions molecules within the combustion products.

The engine may be configured as or otherwise include a gas turbine engine.

The debris particles may be configured as or otherwise include material liberated from an internal component of the engine.

The saturation current probe may include a plurality of electrodes and a gap between the electrodes. The saturation current probe may be configured to: direct electrical potential across the gap through the gas flow between the electrodes; vary a voltage of the electrical potential directed across the gap; and measure a current of the electrical potential directed across the gap as the voltage is varied to determine the saturation current.

The combustion products may include a plurality of emissions molecules. A first of the emissions molecules may have an emissions molecule mass. The debris may include a plurality of debris particles. A first of the debris particles may have a debris particle mass and volume. The debris particle mass may be at least one order of magnitude greater than the emissions molecule mass.

The debris may include a plurality of debris particles. A first of the debris particles may have a size equal to or greater than one nanometer.

The debris may include a plurality of debris particles. A first of the debris particles may have a size equal to or greater than one micron.

The debris may be configured from or otherwise include metal liberated from an internal component of the engine.

The debris may be configured from or otherwise include ceramic and/or other non-metallic material liberated from an internal component of the engine.

The method may also include ingesting foreign particulate matter into the engine with air for combustion. The debris may be configured from or otherwise include the foreign particulate matter.

The measuring of the saturation current of the gas flow may include: directing electrical potential across a gap between a plurality of electrodes through the gas flow; varying a voltage of the electrical potential; and measuring a current of the electrical potential as the voltage is varied.

The method may also include determining presence of the debris entrained within the gas flow.

The saturation current may be measured using a saturation current probe arranged downstream of a combustor section of the gas turbine engine.

The saturation current may be measured using a saturation current probe arranged downstream of a turbine section of the gas turbine engine.

The method may also include initiating an operation where the debris is determined to be entrained within the gas flow.

The method may also include determining a characteristic of the debris entrained within the gas flow based on the saturation current.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
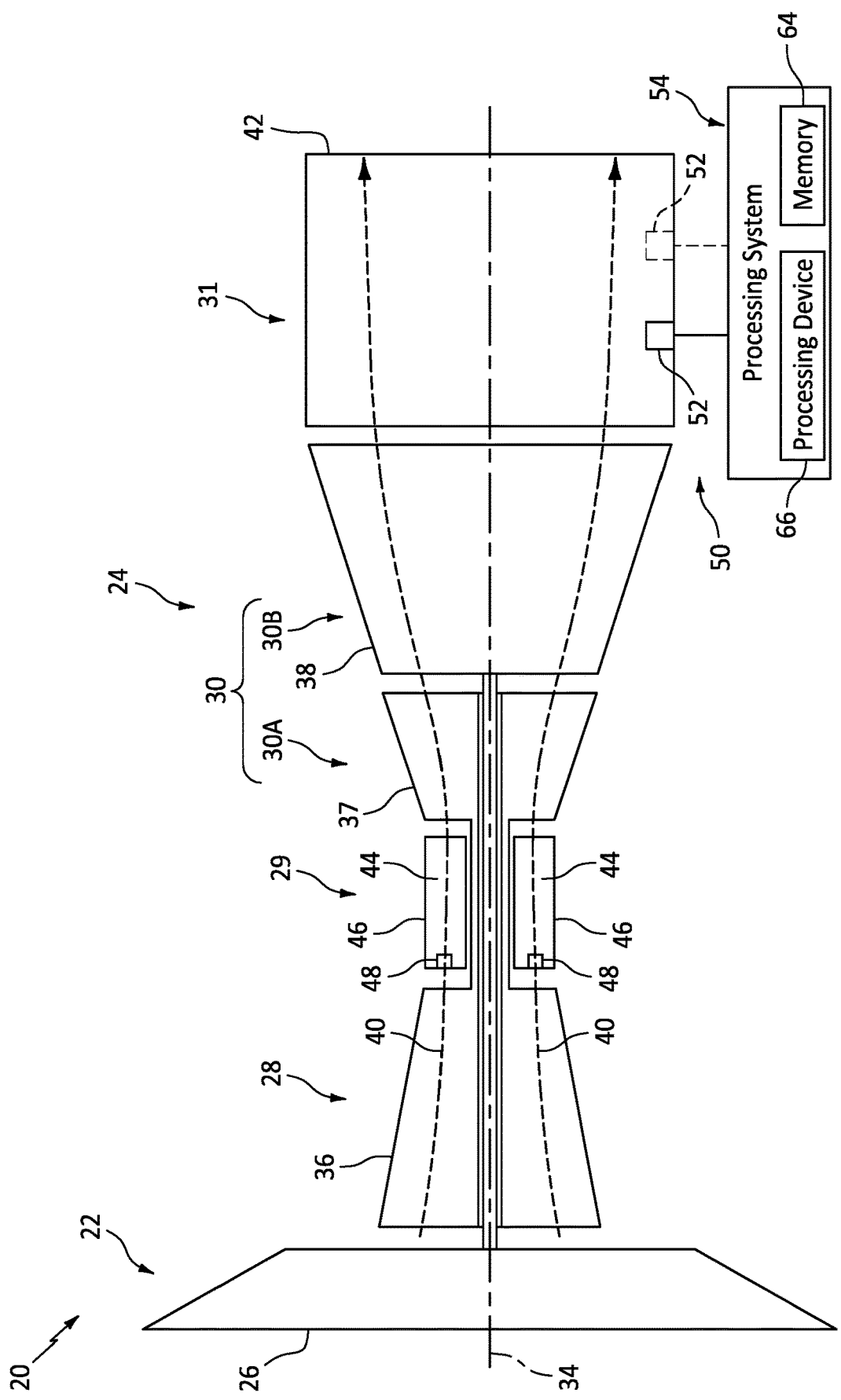
FIG. 1 is a schematic illustration of a powerplant for an aircraft.

FIG. 1 is a schematic illustration of a powerplant 20 for an aircraft such as, but not limited to, an airplane or a drone (e.g., an unmanned aerial vehicle (UAV)). This powerplant 20 may be configured as, or otherwise included as part of, a propulsion system for the aircraft. The powerplant 20 may also or alternatively be configured as, or otherwise included as part of, a hybrid turbine-electrical power system for the aircraft. The present disclosure, however, is not limited to aircraft applications. The powerplant 20, for example, may alternatively be configured as, or otherwise included as part of, a propulsion system and/or an electrical power system for another type of vehicle, a ground-based electrical power system (e.g., an industrial power system), etc. However, for ease of description, the powerplant 20 may be described below with respect to the aircraft propulsion system.

The powerplant 20 includes a mechanical load 22 and a powerplant engine 24. The mechanical load 22 may be configured as or otherwise include at least one driven rotor 26. The mechanical load 22, for example, may be configured as a bladed propulsor rotor for the aircraft propulsion system. Examples of the propulsor rotor include, but are not limited to, a propeller for a propeller engine (e.g., a turboprop engine), a fan for a ducted fan engine (e.g., a turbofan engine), an open rotor for an open rotor engine (e.g., a pusher fan engine, an open tractor rotor engine, etc.), and a compressor rotor (e.g., a low-pressure compressor (LPC) rotor) for a turbojet engine. The mechanical load 22 may alternatively be configured as a generator rotor in an electrical power generator for the power system. The present disclosure, however, is not limited to the foregoing exemplary mechanical loads nor the foregoing exemplary powerplant configurations.

The engine 24 may be configured as a gas turbine engine. The engine 24 of FIG. 1, for example, includes a compressor section 28, a combustor section 29, a turbine section 30 and an exhaust section 31. The turbine section 30 of FIG. 1 includes a high-pressure turbine (HPT) section 30A and a low pressure turbine (LPT) section 30B; e.g., a power turbine section, a free turbine section, etc. The mechanical load 22, the compressor section 28, the combustor section 29, the HPT section 30A, the LPT section 30B and the exhaust section 31 may be arranged sequentially along an axial centerline 34 of the powerplant 20 and its engine 24, which axial centerline 34 may also be a rotational axis for rotors within the powerplant sections 22, 28, 30A and 30B.

Each of the powerplant sections 28, 30A and 30B includes a respective bladed rotor 36-38. The driven rotor 26 is connected to and rotatably driven by the LPT rotor 38 through a low speed drivetrain; e.g., a shaft. The compressor rotor 36 is connected to and rotatably driven by the HPT rotor 37 through a high speed drivetrain; e.g., a shaft.

During powerplant operation, air is directed (e.g., through the driven rotor 26 such as a propulsor rotor) into a core flowpath 40. The core flowpath 40 extends sequentially through the compressor section 28, the combustor section 29, the HPT section 30A, the LPT section 30B and the exhaust section 31 to an exhaust nozzle 42. The air entering the core flowpath 40 may be referred to as core air.

The core air is compressed by the compressor rotor 36 and directed into a (e.g., annular) combustion chamber 44 of a (e.g., annular) combustor 46 in the combustor section 29. Fuel (e.g., hydrocarbon fuel) is injected into the combustion chamber 44 via one or more fuel injectors 48 of a fuel system and mixed with the compressed core air to provide a fuel-air mixture. This fuel-air mixture is ignited, and combustion products thereof flow through and sequentially cause the HPT rotor 37 and the LPT rotor 38 to rotate. The combustion products are subsequently exhausted from the powerplant 20 and its engine 24 through the exhaust nozzle 42, which may provide powerplant thrust. The rotation of the HPT rotor 37 drives rotation of the compressor rotor 36 and, thus, compression of the air entering the core flowpath 40. The rotation of the LPT rotor 38 drives rotation of the driven rotor 26. Where the driven rotor 26 is configured as the propulsor rotor, the rotation of the driven rotor 26 may propel another airflow (e.g., a bypass airflow) through (e.g., internal to) and/or along (e.g., external to) the powerplant and its engine 24 to provide additional powerplant thrust. Where the driven rotor 26 is configured as the generator rotor, the rotation of the driven rotor 26 may facilitate generation of electricity by the electrical power generator.

The combustion products exhausted by the powerplant 20 and its engine 24 include emissions gases and emissions molecules. Examples of the emissions gases may include, but are not limited to, water ($H_2O$), carbon dioxide ($CO_2$) and nitrous oxide ($N_2O$). Examples of the emissions molecules may include, but are not limited to, carbon-based ions such as $CE^+$ and $CAI^+$, which emissions molecules may be precursors to and/or may form soot. These ions can transfer charge to other molecules and particles in the flow via collision (Brownian motion of particles and molecules). Particles in the flow, being much heavier than gas molecules may lag behind the bulk flow, and thus may have more time to collide with the charge particles and attain a higher charge than the bulk gas flow.

An exhaust gas flow of the combustion products traveling through the core flowpath 40 and/or exiting the powerplant 20 and its engine 24 through the exhaust nozzle 42 may also include debris. This debris may be or otherwise include one or more materials that enters the engine as Foreign Object Debris (FOD) or liberated (e.g., worn away, decomposed, broken off from normal aging of the parts or from collision with FOD, and/or otherwise released) from one or more components of the engine 24; e.g., a blade, a vane, a liner, a shroud, a blade outer air seals (BOAS), etc. The debris, for example, may be or include material(s) forming a component body. The debris may also or alternatively be or include material(s) coating the component body. Examples of such debris may include, but are not limited to, metal and ceramic. Examples of the metal may include, but are not limited to, titanium (Ti), nickel (Ni), aluminum (Al), iron (Fe) or an alloy (e.g., a superalloy) including one or more thereof. Examples of the ceramic may include, but are not limited to, a monolithic ceramic and a ceramic matrix composite (CMC). The debris may still also or alternatively be or otherwise include foreign particulate matter which was previously ingested into the powerplant 20 and its engine 24 with the incoming air. The debris may include, but is not limited to, dirt and/or sand, particulate pollutants in the air, trash on or near the runway or aircraft carrier deck, flora and fauna, and other materials.

Presence of the debris within the exhaust gas flow may correlate to engine condition, engine performance and/or engine efficiency. The presence of the debris, for example, may indicate that one or more internal components of the engine 24 are degrading and thereby liberating the debris material, e.g., when airfoil blade tips rubbing against their casings. The presence of the debris may also or alternatively indicate that the engine 24 is operating within harsh operating conditions (e.g., within a dusty and/or sandy environment at aircraft takeoff and/or aircraft landing) where the debris material is ingested into the engine 24. Typically, as engine condition degrades (e.g., as engine components become more worn, damaged, etc.), the engine performance and/or the engine efficiency also degrades. Therefore, to monitor the presence of the debris within the exhaust gas flow, the powerplant 20 of FIG. 1 includes an exhaust debris monitoring system 50.

The debris monitoring system 50 includes a saturation current probe 52 (or multiple saturation current probes 52) and a processing system 54. The saturation current probe 52 is arranged with the engine 24 downstream of a combustion zone; e.g., the combustion chamber 44 of FIG. 1. The saturation current probe 52 of FIG. 1, more particularly, is arranged along and within the core flowpath 40 downstream of the turbine section 30; e.g., within the exhaust section 31, upstream of the exhaust nozzle 42.

Figure 2:
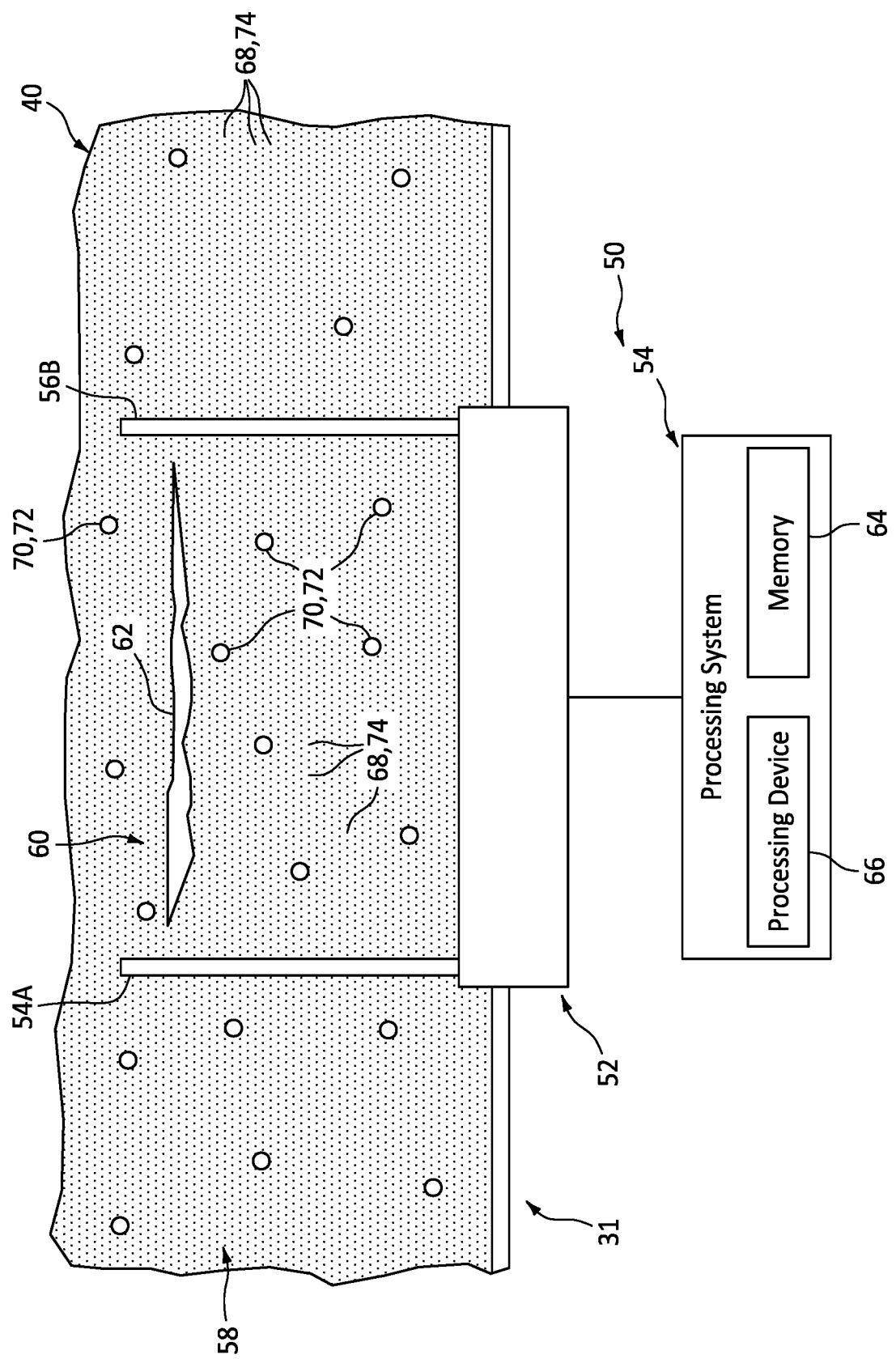
FIG. 2 is a schematic illustration of an exhaust debris monitoring system arranged with a core flowpath within the powerplant.

The saturation current probe 52 may be configured as an electrostatic sensor. The saturation current probe 52 of FIG. 2, for example, includes a plurality of electrodes 56A and 56B (generally referred to as 56). Each of these electrodes 56 projects into the core flowpath 40 such that the exhaust gas flow (e.g., see 58 in FIG. 2) directed through the core flowpath 40 may pass through a gap 60 between the electrodes 56. However, the orientation and geometry of the electrodes 56 in FIG. 2 is just one example, and there are many other ways to arrange the electrodes 56 such that those electrodes 56 are exposed to the exhaust flow and the exhaust flow may pass through the space separating the two electrodes 56. The saturation current probe 52 of FIG. 2 is configured to direct (e.g., arc) an electrical potential 62 across the gap 60, through the exhaust gas flow 58, between the electrodes 56. The saturation current probe 52 is configured to vary a voltage of the electrical potential 62 between the electrodes 56. The saturation current probe 52 is also configured to measure a current of the electrical potential 62 between the electrodes 56 as the voltage is being varied to measure a saturation current (e.g., when the current ceases to increase with increasing electrical potential) of the exhaust gas flow 58. It is also possible to consider the transient response of the current to a change in the electrical potential with further signal processing.

The processing system 54 is in sensor control, signal processing, and signal communication (e.g., hardwired and/or wirelessly coupled) with the saturation current probe 52 (or probes 52). The processing system 54 may be implemented with a combination of hardware and software. The hardware may include memory 64 and at least one processing device 66, which processing device 66 may include one or more single-core and/or multi-core processors. The hardware may also or alternatively include analog and/or digital circuitry other than that described above.

The memory 64 is configured to store software (e.g., program instructions) for execution by the processing device 66, which software execution may control and/or facilitate performance of one or more operations such as those described below. The memory 64 may be a non-transitory computer readable medium. For example, the memory 64 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc. The memory 64 may also be configured to store data resulted from the operation of the saturation current probe and also the issuance of the occurrence of debris detections.

Figure 3:
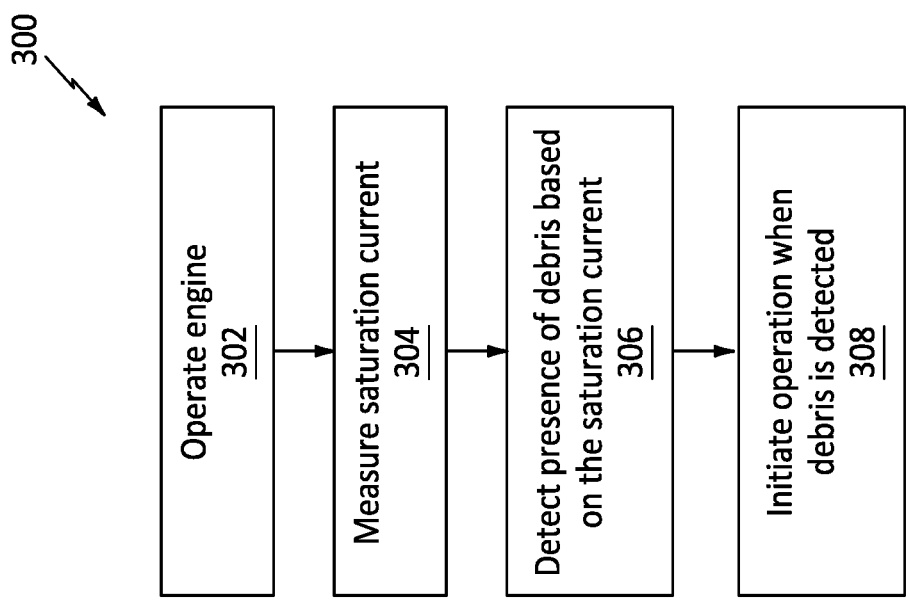
FIG. 3 is a flow diagram of a method using a debris monitoring system.

FIG. 3 is a flow diagram of a method 300 involving an engine and a debris monitoring system for the engine. For ease of description, the method 300 is described below with respect to the engine 24 and its debris monitoring system 50 of FIGS. 1 and 2. The method 300 of the present disclosure, however, is not limited to such exemplary powerplant components 24 and/or 50.

In step 302, the engine 24 is operated. During this engine operation, the exhaust gas flow 58 may travel through the core flowpath 40 and then out of the engine 24 through the exhaust nozzle 42 as described above. This exhaust gas flow 58 may be made up substantially (or only) of the combustion products (e.g., see 68 in FIG. 2). Under certain conditions, however, the exhaust gas flow 58 may also include the debris (e.g., see 70 in FIG. 2).

In step 304, the saturation current of the exhaust gas flow 58 (e.g., within the exhaust section 31) is measured. For example, the electrical potential difference (voltage) 62 is directed (e.g., arced) across the gap 60, through the exhaust gas flow 58, between the electrodes 56 of FIG. 2. The voltage of the electrical potential 62 is selectively varied (e.g., steadily or incrementally increased and/or decreased) between the electrodes 56, where the variation of the electrical potential voltage is controlled by the processing system 54. The current of the electrical potential 62 between the electrodes 56 is measured as the voltage is being varied to measure the saturation current of the exhaust gas flow 58.

The debris 70 may be in a form of debris particles 72 (e.g., non-emissions particles) entrained within (e.g., mixed with, carried by, etc.) the exhaust gas flow 58. Typically, the debris particles 72 are heavier than the emissions molecules (e.g., see 74 in FIG. 2). In particular, each debris particle 72 has a debris particle mass and each emissions molecule 74 has an emissions molecule mass that is less than the debris particle mass. For example, the debris particle mass of one, some or all of the debris particles 72 may be equal to or greater than one, two, three or more orders of magnitude (e.g., times $10^1$, $10^2$, $10^3$ . . . $10^n$) of the emissions molecule mass of one, some or all of the emissions molecules 74. The debris particles 72 may also be larger than the emissions molecules 74. In particular, each debris particle 72 has a debris particle size (e.g., a diameter) and mass; and each emissions molecule 74 has an emissions molecule size (e.g., a diameter) and mass that are less than the debris particle size and mass. In some embodiments, the debris particle size of one, some or all the debris particles 72 may be equal to or greater than one or several nanometers. In some embodiments, the debris particle size of one, some or all of the debris particles 72 may be equal to or greater than one or several microns.

Figure 4:
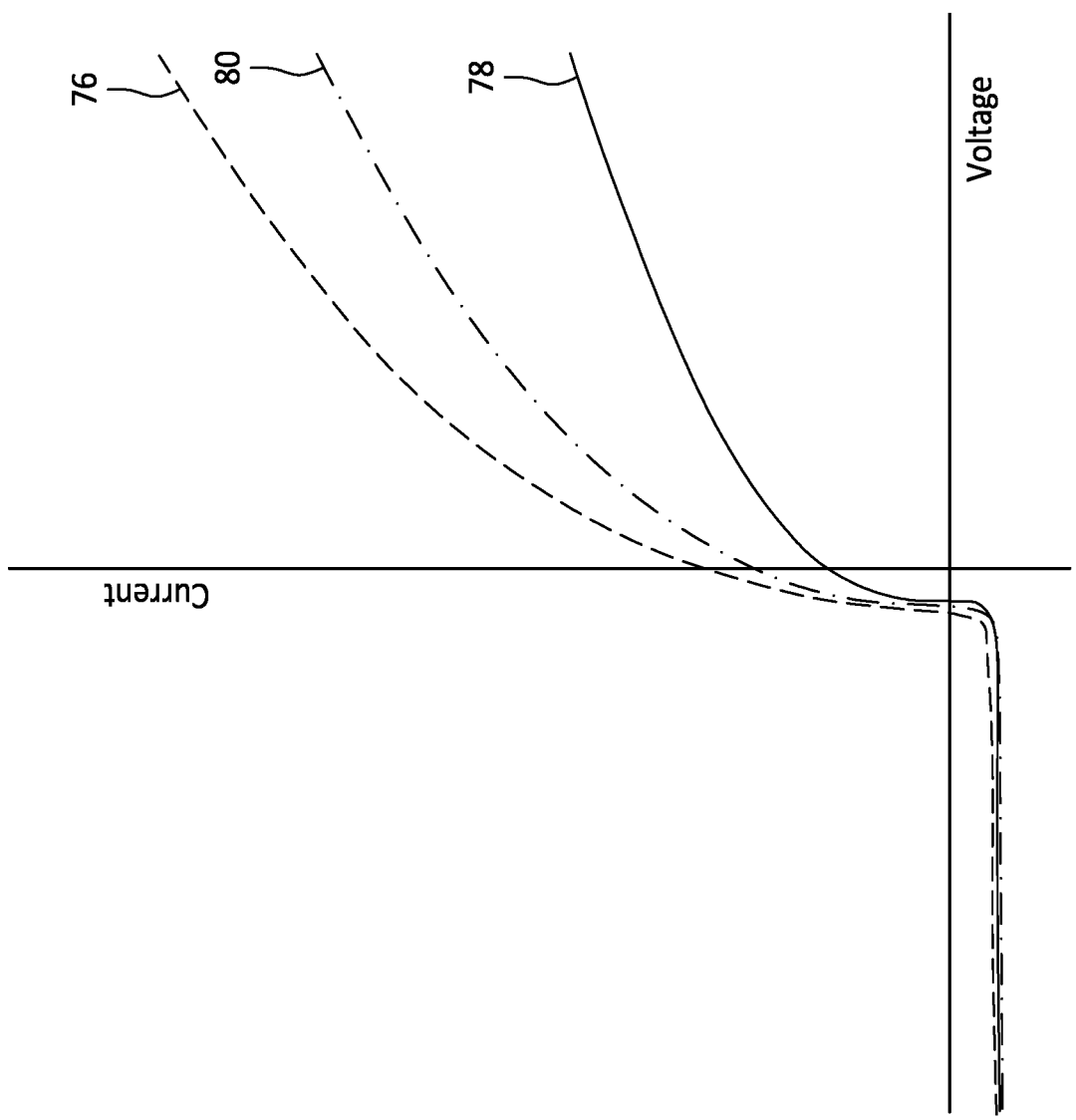
FIG. 4 is a graph of voltage versus saturation current for various exhaust gas flows.

Exhaust from the combustor 46 is laden with ions (charged molecules), and the particles and debris within the exhaust are charged from charge exchanges with the ionized flow from the combustor 46. Such background charge may mask the charge of the debris thereby making detection of the particles and debris more difficult. However, the saturation current measured by the saturation current probe 52 may change based on the makeup of the exhaust gas flow 58 passing through the gap 60. The saturation current for an exhaust gas flow of substantially or only the combustion products 68, for example, may be different than the saturation current for an exhaust gas flow also carrying the debris 70. Since the heavier and/or larger debris particles 72 may move and accelerate slower than the lighter and/or smaller emissions molecules 74 when subjected to an electrical potential, a ratio of the measured saturation current to the voltage for the emissions molecules 74 may be different (e.g., greater) than a ratio of the measured saturation current to the voltage for the debris particles 72. This differential is exemplified in FIG. 4. Here, the ratio of the measured saturation current to the voltage for the exhaust gas flow 58 with substantially (or only) the combustion products 68 (see line 76) is greater than the ratio of the measured saturation current to the voltage for the exhaust gas flow 58 with the combustion products 68 and a relatively large quantity of the debris particles 72 (see line 78).

In step 306, the saturation current of the exhaust gas flow 58 is monitored to determine the presence of (e.g., detect) the debris 70 within the exhaust gas flow 58. For example, the processing system 54 may receive probe data from the saturation current probe 52 indicative of the measured saturation current. The processing system 54 may process this probe data to identify the presence of the debris 70 within the exhaust gas flow 58. For example, the processing system 54 may compare the measured saturation current (or a derivation thereof) to a threshold or a predetermined calibration curve or use modern data analytics methods such as a trained neural network. Where the measured saturation current (or the derivation thereof) is detected by the analytics method coded in the processing system 54, the system may determine that debris 70 is present within the exhaust gas flow 58. The debris monitoring system 50 may functionally filter out (e.g., ignore) effects to the saturation current based on (e.g., solely) the emissions molecules 74 or may be trained on data with known presence of debris. The measured saturation current corresponding to the exhaust gas flow 58 with substantially or only the emissions products (see line 76), for example, provides a baseline above the threshold (see line Other lab created datasets with debris added, for example, can be added to the data set for training of the detection algorithms. The detection algorithm may also be trained to recognize noise in the signal and filter the noise out to reduce the change of issuing false alarms and to increase the probability of true positive detection instances.

In step 308, an operation is initiated when the debris 70 is detected within the exhaust gas flow 58. For example, where it is determined that the debris 70 is present within the exhaust gas flow 58, the debris monitoring system 50 may provide an indicator (e.g., a notification) to an operator of the engine 24 (e.g., a pilot). The debris monitoring system 50 may also or alternatively provide (or store for later retrieval) an indictor to maintenance personnel such as issuing a Health Report Code (HRC). This indicator may indicate the engine 24 should be inspected and/or undergo maintenance. In another example, where a threshold amount of the debris 70 is detected within the exhaust gas flow 58, the debris monitoring system 50 may initiate a process to schedule engine service and/or an engine overhaul; e.g., where the debris 70 is present for a certain period of time and/or more than a threshold level of the debris 70 is detected. Of course, various other operations may also or alternatively be initiated upon detection of the debris 70 within the exhaust gas flow 58.

In some embodiments, a characteristic of the debris 70 within the exhaust gas flow 58 may be determined based on the saturation current. For example, different types of debris may influence the measured saturation current in different manners; e.g., metal debris particles may be heavier and, thus, slower than ceramic debris particles. In general, the mass and size of the debris (particles) can be discerned from the saturation current measurement. Thus, different types of debris may be associated with/have different saturation current signatures. The measured/the monitored saturation currents may be compared to these signatures or by trained machine learning algorithms to identify the type of debris. By knowing the type of debris, it may also be possible to deduce a source of the debris 70. For example, where the debris 70 is ceramic, it may be determined that the debris 70 is being liberated from a coating on certain internal engine components.

The debris monitoring system 50 may be included in various engines other than the one described above. The debris monitoring system 50, for example, may be included in a geared turbine engine where a geartrain connects one or more shafts to one or more rotors in a fan section, a compressor section and/or any other engine section. Alternatively, the debris monitoring system 50 may be included in a turbine engine configured without a geartrain. The debris monitoring system 50 may be included in a geared or non-geared turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of gas turbine engines. It is also contemplated the debris monitoring system 50 may be used to detect/monitor debris in an exhaust gas flow from an internal combustion engine other than a gas turbine engine.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An engine system, comprising:
   a saturation current probe configured to measure a saturation current of a gas flow, wherein the gas flow comprises combustion products generated within an engine by combustion of a fuel-air mixture; and
   a processing system configured to determine presence of debris particles entrained within the gas flow with the combustion products based on the saturation current.

2. The engine system of claim 1, wherein the engine comprises a gas turbine engine.

3. The engine system of claim 1, wherein the debris particles comprise material liberated from an internal component of the engine.

4. The engine system of claim 1, wherein the saturation current probe includes a plurality of electrodes and a gap between the plurality of electrodes, and the saturation current probe is configured to
   direct electrical potential across the gap through the gas flow between the plurality of electrodes;
   vary a voltage of the electrical potential directed across the gap;
   measure a current of the electrical potential directed across the gap as the voltage is varied to determine the saturation current.

5. The engine system of claim 1, wherein
   the combustion products include a plurality of emissions molecules, and a first of the plurality of emissions molecules has an emissions molecule mass;

a first of the debris particles has a debris particle mass; and the debris particle mass is at least one order of magnitude greater than the emissions molecule mass.

6. The engine system of claim 1, wherein a first of the debris particles has a size equal to or greater than one nanometer.

7. The engine system of claim 1, wherein a first of the debris particles has a size equal to or greater than one micron.

8. The engine system of claim 1, wherein the debris particles comprise at least one of ceramic or other non-metallic material.

9. The engine system of claim 1, wherein the debris particles comprise foreign particulate matter ingested into the engine with air for the combustion.

10. The engine system of claim 2, wherein the saturation current probe is arranged downstream of a combustor section of the gas turbine engine.

11. The engine system of claim 2, wherein the saturation current probe is arranged downstream of a turbine section of the gas turbine engine.

12. The engine system of claim 1, wherein the processing system is further configured to determine a characteristic of the debris particles entrained within the gas flow based on the saturation current.

13. The engine system of claim 1, wherein the debris particles are distinct from emissions molecules within the combustion products.

14. An engine system, comprising:
a saturation current probe comprising a plurality of electrodes, the saturation current probe configured to
direct an electrical potential across a gas flow flowing through a gap between the plurality of electrodes, the gas flow comprising combustion products generated by combustion of a fuel-air mixture within a gas turbine engine;
vary a voltage of the electrical potential directed across the gas flow through the gap between the plurality of electrodes; and
measure a saturation current of the electrical potential directed across the gas flow through the gap between the plurality of electrodes as the voltage is varied; and a processing system configured to determine presence of debris particles entrained within the gas flow based on the saturation current.

15. The engine system of claim 14, wherein the debris particles are distinct from emissions molecules within the combustion products.

16. A method for an engine, comprising:
measuring a saturation current of a gas flow using a saturation current probe, the gas flow comprising combustion products generated within the engine by combustion of a fuel-air mixture;

communicating probe data indicative of the saturation current measured by the saturation current probe to a processing system; and processing the probe data within the processing system to determine presence of debris particles entrained within the gas flow with the combustion products.

17. The method of claim 16, wherein
the combustion products include a plurality of emissions molecules, and a first of the plurality of emissions molecules has an emissions molecule mass;

a first of the debris particles has a debris particle mass and volume; and the debris particle mass is at least one order of magnitude greater than the emissions molecule mass.

18. The method of claim 16, wherein a first of the debris particles has a size equal to or greater than one nanometer.

19. The method of claim 16, wherein a first of the debris particles has a size equal to or greater than one micron.

20. The method of claim 16, wherein the debris particles comprise metal or ceramic liberated from an internal component of the engine.

* * * * *